Figure 1:
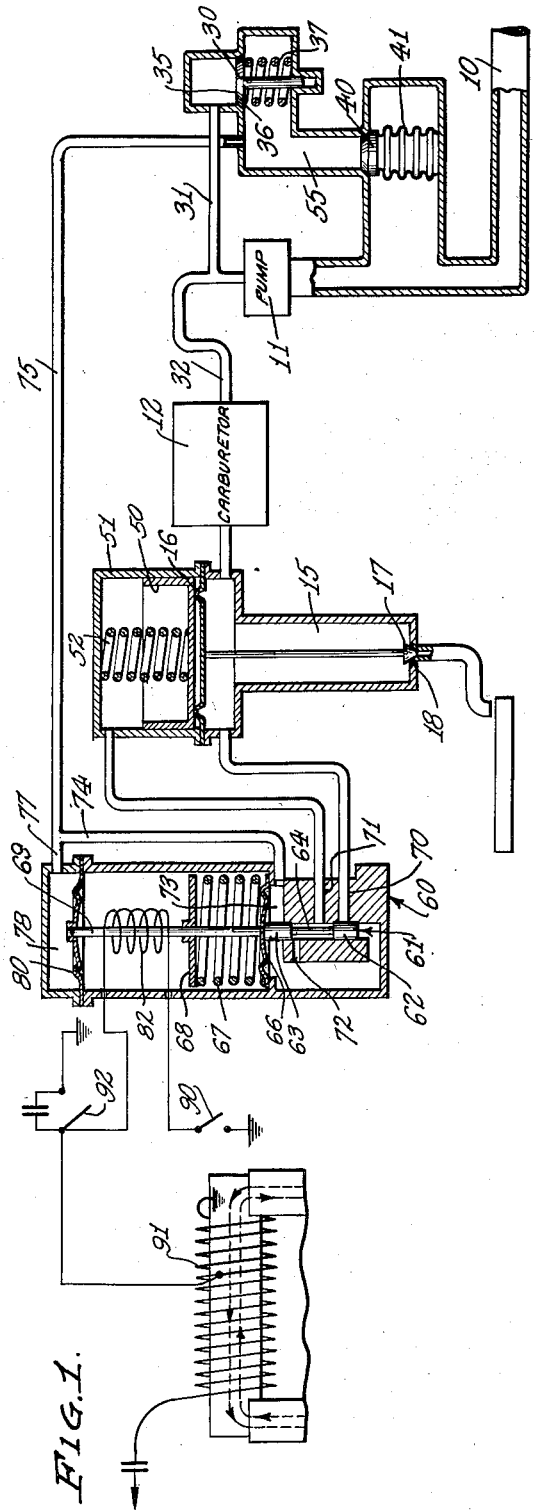

June 6, 1950 — G. E. BEARDSLEY, JR — 2,510,368

CONTROL MEANS FOR FUEL METERING SYSTEMS

Filed Feb. 7, 1946

INVENTOR.
Guy E. Beardsley, Jr.
BY Ernest D. Given
ATTORNEY

Patented June 6, 1950

2,510,368

UNITED STATES PATENT OFFICE 2,510,368

CONTROL MEANS FOR FUEL METERING SYSTEMS

Guy E. Beardsley, Jr., West Hartford, Conn., assignor to United Aircraft Corporation, East Hartford, Conn., a corporation of Delaware Application February 7, 1946, Serial No. 646,119

6 Claims. (Cl. 123—139)

This invention relates to a controlling device for controlling the pressures throughout the fuel pump and the metering system between the fuel pump and the discharge nozzle of an internal combustion engine as an aircraft engine, so as to overcome the undesirable effects caused by change in altitude. One of these effects is the formation of vapor within the metering system caused by the diminution in pressure in response to increase in altitude. One of the principal objects of this invention, therefore, is the provision of means for maintaining a predetermined absolute pressure throughout the fuel metering system, which pressure shall be independent of changes in altitude. The absolute pressure to be maintained may be predetermined at the pressure prevailing at sea level, or at any other desired pressure such as, for example, the pressure prevailing at the altitude where vapor formations in the fuel metering system begin to be troublesome.

It is a further object of this invention to provide means as described above for maintaining a predetermined absolute pressure throughout the fuel metering system, without increasing the sea level fuel pressure, and, hence, the pressure during take-off.

It is another object of this invention to provide means for maintaining a predetermined pressure throughout the fuel metering system, characterized by the fact that failure of this means will not impair the operation of the fuel metering system beyond rendering such system subject to variations in pressure due to changes in altitude.

The fuel discharge from a pressure carburetor is normally controlled by a diaphragm-operated discharge valve one side of which is subjected to fuel pressure while the other side is subjected to spring pressure and is vented either to atmosphere or to some point such as the Venturi suction line in the carburetor. The spring loading on the diaphragm controls the increment of pressure above the vent pressure at which the fuel is maintained in the discharge valve. More recent experience has shown that the addition of a piston to function in a manner similar to the discharge nozzle diaphragm in case of failure of the diaphragm is desirable. When employing this additional piston, however, there will be leakage of fuel past the piston and this fuel must be returned to the fuel metering system. It is, therefore, another object of this invention to provide in a system wherein the pressure is maintained at a predetermined absolute value, means for returning the leakage fuel to the system without upsetting the fuel metering to the engine and while maintaining the fuel pressure at the discharge nozzle in its normal relation to the pressure throughout the metering system.

Still another object of this invention consists in providing in combination with the venting arrangement referred to above, means for instantaneously stopping the fuel flow from the discharge nozzle when the ignition of the associated aircraft engine is cut off.

Further objects and advantages of this invention will become apparent in the following detailed description thereof.

Figure 2:
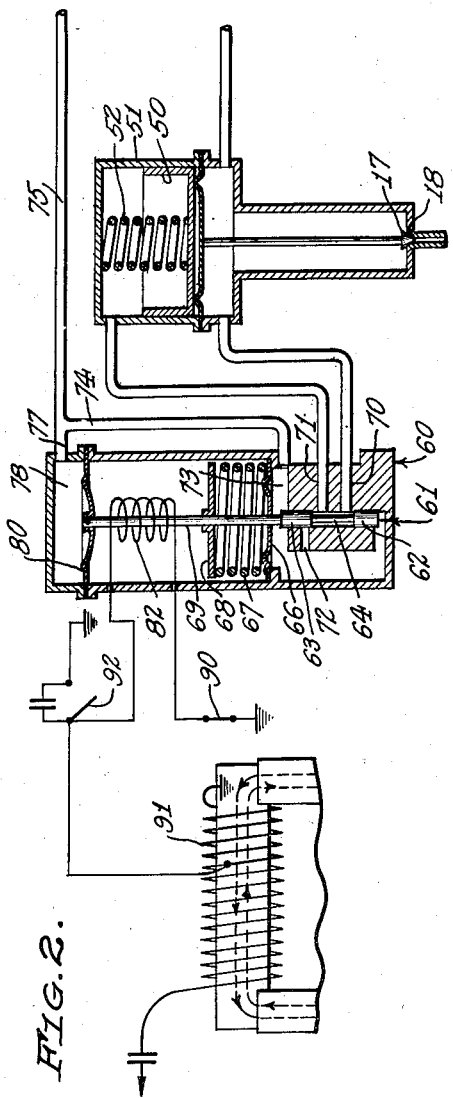

In the accompanying drawings:

Figure 1 is an assembly, largely diagrammatic, illustrating one form of the fuel metering system, including fuel vent return and fuel cut-off, embodying one form of this invention; and Fig. 2 is a view of a portion of Fig. 1 showing the parts in another operating position.

Referring to the drawings, a connection 10 is shown for supplying fuel from a tank (not shown) to a fuel pump 11 which delivers the fuel under pressure to a carburetor 12. The carburetor 12 in this case is usually so called in the aircraft engine art, although it does not act to mix fuel with air but solely to meter the flow of fuel to an associated engine. The metered fuel discharged from the carburetor under pressure is delivered to a discharge chamber 15 which may be of the well known diaphragm type in which a diaphragm 16 carries a needle valve 17 which normally closes opening 18 through which the fuel is discharged into a spinner cup or crab bar in the usual manner. The fuel builds up the pressure in chamber 15 on one side of diaphragm 16, and when this pressure exceeds the pressure on the other side of the diaphragm, the valve 17 opens to discharge the metered fuel onto a spinner, such as a part rotating with the supercharger rotor of an aircraft engine.

The pressure in the fuel metering system is developed by the pump 11, and, in order to maintain this pressure at a predetermined value, a relief valve 30 is positioned in a by-pass connection 31 leading from connection 32 which connects the pump 11 to the carburetor 12, the line 31 returning to the inlet side of the pump. Thus the pressure is built up by the pump in connection 32 and connection 31 until the pressure on the outer face 35 of valve 30 exceeds the pressure on the inner face 36. When such condition prevails, the valve 30 opens and some of the fuel delivered by the pump is returned through valve 30 to the inlet side of the pump. The valve 30 remains open until the pressure on its outer face drops below the pressure on its inner face.

It will be apparent that in the arrangement described above, as heretofore used, the pressure on the inner face 36 of valve 30 determined the pressure which prevailed between pump and carburetor. However, the pressure on the inner face of the valve is the sum of the pressure of spring 37 and atmospheric pressure, and the latter pressure is not constant but varies with altitude. This results in lowering of the absolute pressure between the pump and carburetor as the altitude increases and tends to facilitate the formation of vapor in the line.

In order to obviate the above condition, there is provided means for maintaining a predetermined pressure in the relief line to the pump inlet, which pressure does not vary with change in altitude. For this purpose there is interposed in the relief line, in addition to valve 30, a valve 40 which, unlike valve 30, is not loaded by a spring but by a bellows 41 which has been sealed at a predetermined pressure. By proportioning the effective area of the bellows approximately to equal the effective area of valve 30, the pressure existing between the two valves 40 and 30, and hence the pressure on face 36 of valve 30 will be maintained at least equal to the pressure within the sealed bellows at all times. Since the pressure within the bellows does not vary with altitude, a predetermined constant pressure will be maintained in the relief line regardless of altitude, and therefore a constant pressure will be maintained in the fuel pressure line.

The pressure sealed within the bellows may be sea level pressure, of if the fuel system of the craft is such that no vapor troubles are encountered up to altitudes of, say, 10,000 feet, the bellows may be sealed at a pressure corresponding to an altitude of 10,000 feet. The solution here proposed of the problem of maintaining predetermined pressure at all altitudes by providing a bellows which is sealed at this pressure has the further advantage that damage to, or failure of, the bellows or the bellows-controlled valve does not upset the metering characteristics of the system. The only consequence of such damage or failure is that the system is no longer maintained at sea level or other predetermined pressure regardless of altitude but operates like a standard system with only relief valve 30 functioning. Still another advantage of the solution here presented is that it does not increase the sea level fuel pressure and hence the pressure during take-off. A failure of this bellows-operated relief valve during take-off would have no adverse effects on fuel metering.

The bellows-operated valve for maintaining a predetermined pressure in the fuel metering system without variation due to altitude may be utilized also to maintain the vent line from discharge chamber to pump under the same predetermined pressure. This applies more specifically to the case where the diaphragm 16 is provided on its outer surface with a piston 50 operating in a cylinder 51 against the action of spring 52, so that in the event of failure of diaphragm 16 the piston and its spring will perform the same functions as the diaphragm. The piston, however, creates a different venting problem from that of a diaphragm. In the case of a diaphragm, the side opposite to that subjected to fuel pressure is vented either to atmosphere or to some other place, such as the Venturi suction line of the carburetor. The spring loading of the diaphragm controls the increment of pressure above the vent pressure at which the fuel is maintained in the discharge chamber. However, when the piston becomes effective upon failure of the diaphragm, there is leakage of fuel past the piston, making it necessary to vent the piston, and consequently the diaphragm. A convenient place to connect this vent is the fuel pump inlet, and by connecting this vent to the space 55 between the spring-loaded relief valve 30 and the bellows-operated relief valve 40, the vent line is maintained at the same predetermined pressure as the remainder of the fuel metering system. The fuel pressure at the discharge nozzle is thus maintained at its usual proportion of the pressures throughout the fuel metering system while these pressures are being maintained at their sea level values.

For accomplishing the above described function, there may be provided a servo-mechanism 60 in which operates a slide valve 61 having piston portions 62, 63 separated by a reduced portion 64. The valve 61 is normally maintained in the position shown in Fig. 1 by means of a diaphragm 66 and a spring 67 engaging a member 68 fixed to the valve stem 69. In this position, the fuel side of chamber 15 is blocked by piston portion 62 closing port 70 communicating with chamber 15. A port 71, however, leading from the vent side of diaphragm 16 and piston 50, communicates with reduced portion 64, port 72 and port 73 to connection 74 and connection 75 which leads into the space 55 between relief valves 30 and 40. A connection 77 branches from connection 74 and extends into chamber 78 in the servo-mechanism housing above a diaphragm 80 fixed to the valve stem 69, so that the vent pressure is applied in opposite directions to diaphragms 66 and 80. Taking into consideration the force exterted by the spring 67, the effective areas of diaphragms 66 and 80 are such that when the pressures on the opposite sides of these diaphragms are equal the valve stem 69 and the parts carried thereby, will assume the position shown in Fig. 1.

The servo-mechanism which normally connects the vent line to space 55, provides a means for instantaneously stopping fuel flow from the discharge valve when the ignition for the associated engine (not shown) is cut off. By lowering valve 61 until piston portion 63 closes port 72 (see Fig. 2), the connection of the vent to the pump intake is cut off. At the same time the reduced portion 64 communicates with port 70 and port 71, and the metered fuel entering chamber 15 is permitted to act on both sides of piston 50 or the piston-diaphragm combination, thus rendering the piston-diaphragm combination ineffective and permitting the spring 52 to maintain the discharge nozzle closed.

For operating valve 61 in response to switching off the ignition, the valve stem 69 constitutes the core of a coil 82 of low resistance and inductance in the short circuit of the magneto primary 81, which circuit becomes effective when the ignition switch 90 is closed to render the breaker circuit 92 ineffective. The breaker 92 is a diagrammatic representation of the usual breaker timed and driven by an internal combustion engine and having a condenser connected across the contacts, which contacts are alternately connected and opened away from one another by the associated engine (not shown). By reason of its characteristics, coil 82 will absorb little energy and will not prevent effective short-circuiting of the magneto primary 91. The energy required by coil 82 is only sufficient to actuate valve 61 downwardly, and since this valve is a balanced valve, as previously described, the amount of energy absorbed by coil 82 is small. As soon as the ignition switch 90 is opened the spring 67 will return valve 61 to raised position in which the vented side of the diaphragm 16 is again connected to the vent line and the discharge chamber is disconnected from the vented side of the diaphragm.

In accordance with the patent statutes, the preferred embodiment of the invention has been described, but it will be understood that changes may be made within the scope of the appended claims which define the invention.

What is claimed is:

1. A fuel metering system, comprising a fuel pump having intake and delivery ports, a fuel metering means, a connection between the delivery port of the pump and said fuel metering means, and pressure controlling means connected to said connection for maintaining the fuel pressure to said fuel metering means constant independent of changes in atmospheric pressure, said pressure controlling means including a valve, a spring for maintaining said valve normally closed, a second valve in said connection in series with but mechanically independent of the first named valve, and a bellows for closing said second valve, said bellows being sealed at a predetermined pressure.

2. A fuel metering system, comprising a fuel pump having intake and delivery ports, a fuel metering means, a connection between the delivery port of the pump and said fuel metering means, a return connection from the first connection to the pump intake port, pressure controlling means in the return connection for maintaining the fuel pressure to said fuel metering means constant independent of changes in atmospheric pressure, said pressure controlling means including a valve, a spring tending to maintain said valve normally closed, a second valve in said connection in series with said first valve, a bellows tending to close said second valve, said bellows being sealed at a predetermined pressure, a fuel discharge mechanism including a discharge chamber, a discharge valve, a diaphragm positioned so as in part to define said discharge chamber and operatively connected to the valve, and a spring for applying pressure to the diaphragm to oppose opening of the discharge valve, a connection between said discharge chamber on one side of said diaphragm and said fuel metering means for supplying fuel under pressure to said chamber on one side of said diaphragm, and means for venting the space on the other side of said diaphragm, the last named means including a connection from said other side of said diaphragm to the return connection between the first and second named valves.

3. A fuel metering system for an engine having ignition means, said system comprising a fuel pump having intake and delivery ports, a fuel metering means, a connection between the delivery port of the pump and said fuel metering means, a return connection from the first connection to the pump intake port, pressure relief means in the return connection for maintaining the fuel pressure to said fuel metering means constant independent of changes in atmospheric pressure, a fuel discharge mechanism including a discharge chamber, a discharge valve, spring-pressed means operatively connected to the valve to oppose opening of the valve, a connection between said discharge chamber on one side of said spring-pressed means and said fuel metering means for supplying fuel under pressure to said discharge chamber on one side of said spring-pressed means, and means for venting the space on the other side of the said spring-pressed means, the last named means comprising means normally connecting the vented side of said spring-pressed means to said return connection and normally disconnecting the vented side from said discharge chamber on the fuel side of said spring-pressed means, and means responsive to rendering the ignition system ineffective for disconnecting the vented side of said spring-pressed means from said return connection and connecting the vented side with the fuel side of said spring-pressed means.

4. A fuel metering system for an engine having a magneto including a primary coil and a circuit including a breaker adapted for intermittently making and breaking a circuit through said primary coil, said system comprising a fuel pump having intake and delivery ports, a fuel metering means, a connection between the delivery port of the pump and said fuel metering means, a return connection from the first connection to the pump intake port, pressure relief means in the return connection for maintaining the fuel pressure to said fuel metering means constant independent of changes in atmospheric pressure, a fuel discharge mechanism including a discharge chamber having a discharge valve, spring-pressed means operatively connected to said valve to oppose the opening thereof, a connection between said discharge chamber on one side of said spring-pressed means and said fuel metering means for supplying fuel under pressure to said discharge chamber on one side of said spring-pressed means, and means for venting the space on the other side of said spring-pressed means, the last named means comprising means normally connecting said space on the vent side of said spring-pressed means to said return connection and normally disconnecting said space on the vent side from said discharge chamber on the fuel side of said spring-pressed means, means for substantially short-circuiting said magneto primary coil to stop the engine, and means responsive to such short-circuiting of said magneto primary coil for disconnecting said space on the vent side of said spring-pressed means from said return connection and for connecting said space on the vent side to said discharge chamber on the fuel side of said spring-pressed means.

5. A fuel metering system for an engine having ignition means, said system comprising a fuel pump having intake and delivery ports, a fuel metering means, a connection between the delivery port of the pump and said fuel metering means, a return connection from the first connection to the pump intake port, pressure relief means in the return connection for maintaining the fuel pressure to said fuel metering means constant independent of changes in atmospheric pressure, a fuel discharge mechanism including a discharge chamber having a discharge valve, spring-pressed means operatively connected to said valve to oppose the opening thereof, a connection between said discharge chamber on one side of said spring-pressed means and said fuel metering means for supplying fuel under pressure to said discharge chamber on one side of said spring-pressed means, and means for venting the space on the other side of said spring-pressed means, the last named means comprising a connection to said return connection and a servo-mechanism having ports and a slide valve, means for normally maintaining the slide valve in position to connect said space on the vent side of said spring-pressed means to said return connection, a manually operable switch for rendering said ignition means ineffective, and means responsive to the rendering of the ignition system ineffective for actuating said slide valve to disconnect said space on the vent side of said spring-pressed means from said return connection and to connect said space on the vent side to said discharge chamber on the fuel side of said spring-pressed means.

6. A fuel metering system for an engine having a magneto including a primary coil and a circuit including a breaker adapted for intermittently making and breaking a circuit through said primary coil, said system comprising a fuel pump having intake and delivery ports, a fuel metering means, a connection between the delivery port of the pump and said fuel metering means, a return connection from the first connection to the pump intake port, pressure relief means in the return connection for maintaining the fuel pressure to said fuel metering means constant independent of changes in atmospheric pressure, a fuel discharge mechanism including a discharge chamber having a discharge valve, spring-pressed means operatively connected to said valve to oppose the opening thereof, a connection between said discharge chamber on one side of said spring-pressed means and said fuel metering means for supplying fuel under pressure to said discharge chamber on one side of said spring-pressed means, and means for venting the space on the other side of said spring-pressed means, the last named means comprising a connection to said return connection and a servo-mechanism having ports and a slide valve, means for normally maintaining said slide valve in position to connect said space on the vent side of said spring-pressed means to said return connection, means for substantially short-circuiting said magneto primary coil to stop the engine, and means responsive to such short-circuiting of the magneto primary coil for actuating said slide valve to disconnect said space on the vent side of said spring-pressed means from said return connection and to connect said space on the vent side to said discharge chamber on the fuel side of said spring-pressed means.

GUY E. BEARDSLEY, Jr.

REFERENCES CITED

The following references are of record in the file of this patent:

UNITED STATES PATENTS

| Number | Name | Date |
| --- | --- | --- |
| 2,022,725 | Lazarus et al. | Dec. 3, 1935 |
| 2,136,959 | Winfield | Nov. 15, 1938 |
| 2,165,447 | Browne | July 11, 1939 |
| 2,189,210 | Johnson | Feb. 6, 1940 |
| 2,463,828 | Trisler | Mar. 8, 1949 |